Jan. 18, 1966   J. C. WORST   3,229,796
ADJUSTABLE CONSTANT SPEED MAGNETIC CLUTCH
Filed July 10, 1964   2 Sheets-Sheet 1

INVENTOR.
JOSEPH C. WORST
BY
HIS ATTORNEY

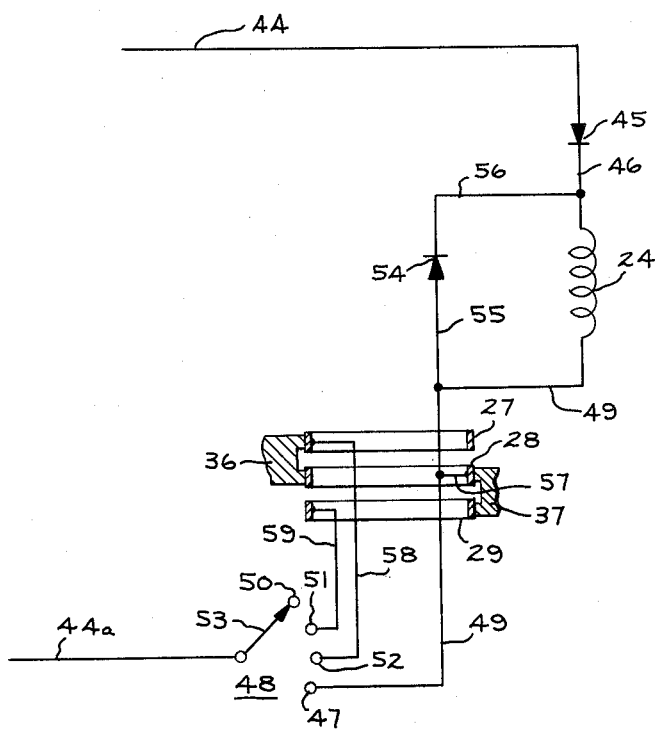

United States Patent Office 3,229,796
Patented Jan. 18, 1966

3,229,796
ADJUSTABLE CONSTANT SPEED MAGNETIC CLUTCH
Joseph C. Worst, Louisville, Ky., assignor to General Electric Company, a corporation of New York
Filed July 10, 1964, Ser. No. 381,635
6 Claims. (Cl. 192—104)

This invention relates to power transmitting mechanisms and, more particularly, to a speed governed clutch of the electromagnetic type.

An object of this invention is to provide an improved clutch of the electromagnetic type.

Another object of this invention is to provide such a clutch to obtain selectively a plurality of speeds.

Another object of this invention is to provide such a clutch which is constructed from a minimum number of low-cost parts and is reliable in operation.

A further object of this invention is to provide such a clutch in which the speed responsive control members are formed as a part of the clutch mechanism itself.

In carrying out this invention, in one form thereof, I provide a rotary driving structure and an adjacent, rotary driven structure. An electrical winding is arranged to induce a magnetic field in the driving structure and the driven structure to operatively connect these structures. In order to selectively provide electrical energy to the electric winding for engaging the driving and driven structures, a control circuit is provided including a number of stationary slip rings and a number of cooperating brushes. The brushes are slidably mounted on the driven structure and each brush is constructed to have a different mass than any other brush so that the individual brushes will move out of contact with their cooperating slip rings at different speeds. A switch is provided for including a selected one of the brushes in the control circuit for the electrical winding so that the electrical energy to the winding is interrupted at a predetermined speed in order that the driven structure may be rotated at such predetermined speed.

The subject matter which I regard as my invention is particularly pointed out and distinctly claimed in the concluding portion of the specification. My invention, however, both as to organization and method of operation, together with further objects and advantages thereof, may best be understood by reference to the following description, taken in conjunction with the accompanying drawings.

In the drawings:

FIGURE 3 is a schematic representation of the electrical control circuit utilized with the clutch mechanism.

Figure 1:
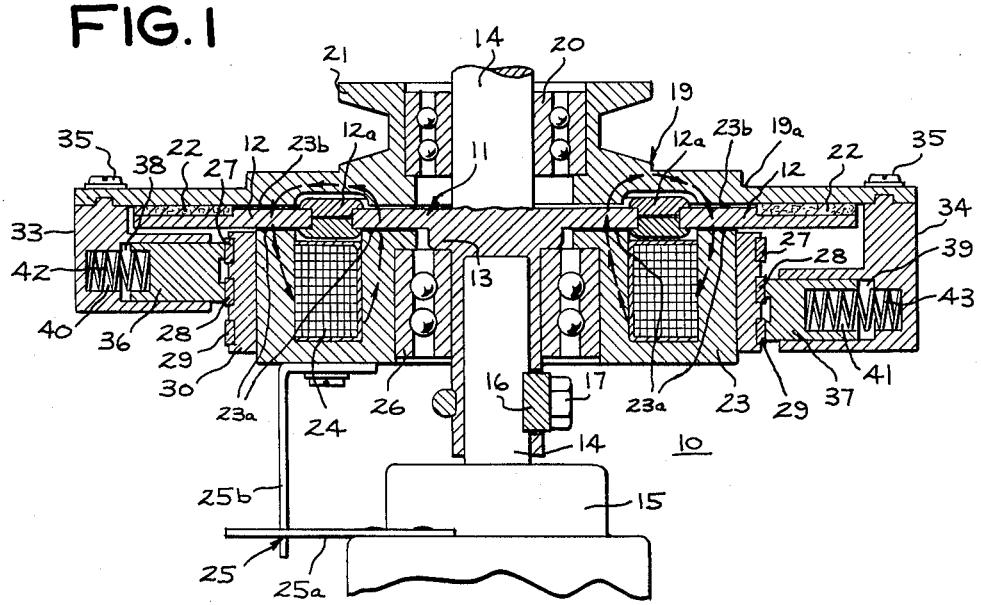
FIGURE 1 is a sectional view of a clutch mechanism constructed in accordance with my invention.
Figure 2:
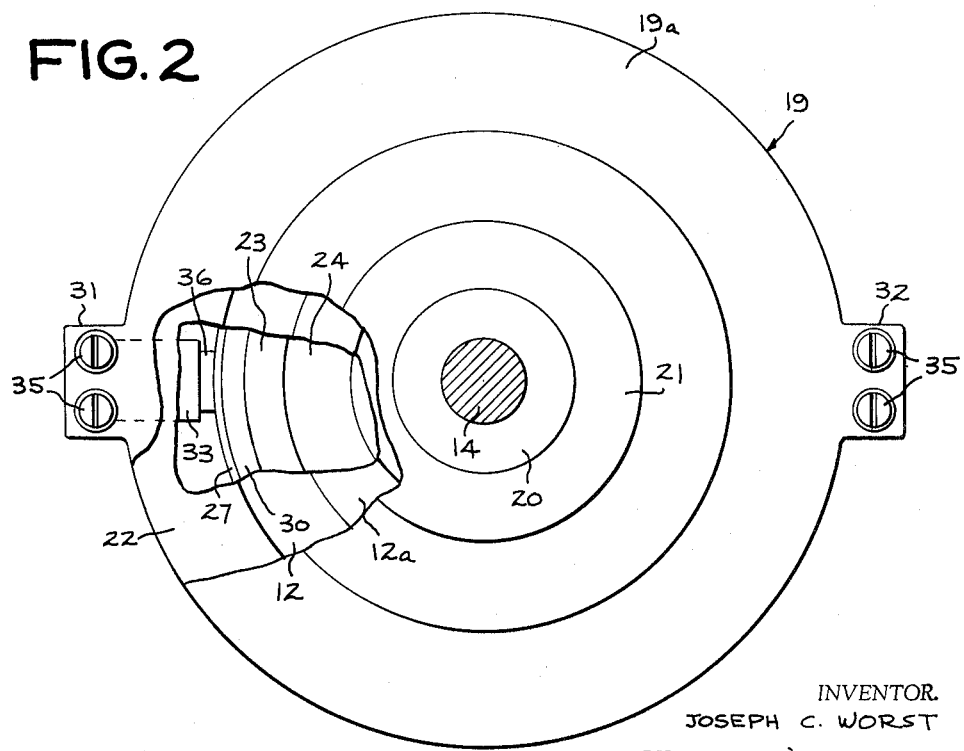
FIGURE 2 is a plan of the clutch mechanism of FIGURE 1, the view being partly broken away to illustrate details.

Referring now to FIGURES 1 and 2, there is shown an electromagnetic clutch mechanism 10 including a rotary driving structure 11. The driving structure is formed with a flat driving plate 12 and an integral hub 13. The hub is mounted on the shaft 14 of a suitable motor 15 for rotation therewith by any suitable arrangement such as a clamp 16 and bolt 17.

A driven structure 19 including a flat, driven member 19a is mounted on shaft 14 adjacent driving structure 11 by means of a bearing 20 received between the driven structure 19 and the shaft. In the particular embodiment shown, the driven structure 19 includes a pulley portion 21 for transfer of the movement from the clutch, although it will be obvious that any other suitable transfer structure could be utilized.

An annular body 22 of friction material is mounted near the outer periphery of the driving plate 12 so that, when driven member 19a is brought into engagement with the friction material, a good driving engagement is effected therebetween to rotate the driven structure 19 with the driving structure 11.

In order to bring the driving structure and driven structure into driving relationship a core 23 of magnetic material is mounted on the side of the driving structure 11 axially opposite from the driven structure. The core supports an electrical winding 24 adjacent a paramagnetic isolation piece 12a. In order that the core and winding may remain stationary while the remainder of the clutch is rotated, the core is supported on the motor 15 by means of a bracket 25 and is mounted on the hub 13 by a bearing 26. The bracket 25 includes a base member 25a, which is connected to the motor 15, and an interlocking arm 25b, which is connected to the core 23. Thus the core is held stationary and is prevented from rotating with the driving structure. The driving structure 11 is formed from magnetic material, except for an annular nonmagnetic shunt piece 12a provided in driving plate 12 adjacent electrical winding 24. The driven structure 19 also is made of magnetic material. Thus, when an electric current is passed through the winding 24, a magnetic field passes through the core 23, the air gap 23a between core 23 and driving plate 12, the driving plate 12, the air gap 23b between driving plate 12 and driven member 19a and through the driven member 19a as illustrated by the arrows in FIGURE 1. This magnetic field provides a force which pulls the driven member 19a and driving plate 12 together so that the driven member is brought into driving engagement with the body of friction material 22.

In order to cause the clutch to operate at selected predetermined speeds stationary slip rings 27, 28 and 29 are mounted around the core 23 in a body of insulating material 30. Driven member 19a is provided with a pair of oppositely disposed ears 21 and 32, and mounting cups 33 and 34 are secured to the ears 31 and 32, respectively, by screws 35. Brushes 36 and 37 are mounted in recesses 38 and 39 provided in the mounting cups 33 and 34, respectively, with brush 36 being disposed to engage slip rings 27 and 28, and brush 37 disposed to engage slip rings 28 and 29. The ends of the brushes 36 and 37 received in the recesses 38 and 39 are provided with recesses 40 and 41 in alignment with the recesses 38 and 39, respectively, the recess 41 being larger than the recess 40 so that the brush 36 has a greater mass than the brush 37. A coil spring 42 is mounted in recesses 38 and 40 for biasing brush 36 into contact with slip rings 27 and 28. A similar coil spring 43, having the same spring constant as spring 42, is mounted in recesses 39 and 41 for biasing brush 37 into contact with slip rings 28 and 29. As the driven structure 19 is rotated the driven member 19a rotates the mounting cups and brushes. The centrifugal force on the brushes 36 and 37, as a result of this rotation, causes the brushes to move outwardly (as seen in FIGURE 1) so that they become disengaged from the slip rings at predetermined speeds.

The slip rings are included in the control circuit for the clutch and a switch is provided for selectively including one of the brushes in the control circuit. By this arrangement the speed of rotation of the driven structure is utilized to disconnect the coil 24 from the source of electrical energy and thereby disengage the driving plate 12 and driven member 19a. Therefore, the clutch is effective to rotate the driven structure at a pre-determined speed.

Referring now to FIGURE 3, there is shown a schematic representation of a supply and control circuit for effecting such a clutch operation. Leads 44 and 44a connect the clutch to a suitable source of alternating current electrical energy (not shown). Electrical winding 24 is connected to one side of the alternating current source of energy through lead 44, a diode 45 and a lead 46. The diode 45 functions as a rectifier to provide half wave D.-C. power to electrical winding 24. The other side of the winding 24 is connected to one stationary contact 47 of a switch 48 by means of a lead 49.

The switch 48 is provided for selective energization of winding 24 by connection to the other side of the alternating current source through lead 44a. In addition to contact 47, switch 48 includes other stationary contacts 50, 51 and 52 and a movable contact 53, which is connected to lead 44a. A second diode 54 is connected across the electrical winding 24 by leads 55 and 56 so that as the magnetic field around winding 24 tends to collapse between pulses of D.-C. power, the current thus induced in winding 24 circulates through winding 24 and diode 54. Also, when movable contact 53 is moved between the various stationary contacts or brushes 36 and 37 move away from their associated slip rings, any current induced by the magnetic field around winding 24 circulates through diode 54 and winding 24 without causing any arcing of the contacts or brushes.

Slip ring 28 is connected to lead 49 by a lead 57. Slip ring 27 is connected to stationary contact 52 through a lead 58 so that brush 36 controls the supply of electrical energy to winding 24. Slip ring 29 is connected to stationary contact 51 through a lead 59 so that brush 37 controls the supply of electrical energy to winding 24.

Stationary contact 50 is not connected to the circuit and is utilized when the switch is set in the off position. When the movable contact 53 engages stationary contact 47 an electrical circuit is completed through lead 44, diode 45, lead 46, electrical winding 24, lead 49, stationary contact 47, movable contact 53 and lead 44a. With this arrangement electrical winding 24 is always in the circuit and driving plate 12 and driven member 19a are continuously attracted so that the driven structure 19 is rotated at the full speed of the motor.

When movable contact 53 is in engagement with stationary contact 52 the electrical supply circuit includes lead 44, diode 45, lead 46, winding 24, lead 49, lead 57, slip ring 28, brush 36, slip ring 27, lead 58, stationary contact 52, movable contact 53 and lead 44a. Thus, winding 24 is energized only so long as brush 36 is in contact with slip rings 27 and 28. Therefore, when the speed of the driven structure reaches a sufficient value that centrifugal force overcomes the pressure exerted on brush 36 by spring 42 and brush 36 moves out of contact with slip rings 27 and 28, the electrical winding 24 will be de-energized and the driving connection between driving plate 12 and driven member 19a will be interrupted.

Similarly, when movable contact 53 is in engagement with stationary contact 51, the electrical circuit includes lead 44, diode 45, lead 46, winding 24, lead 49, lead 57, slip ring 28, brush 37, slip ring 29, lead 59, stationary contact 51, movable contact 53 and lead 44a. Thus, when the speed of the driven structure reaches a sufficient value to overcome the pressure exerted on brush 37 by spring 43, the electrical circuit will be interrupted and winding 24 will be de-energized and the driving connection between driving plate 12 and driven member 19a will be interrupted. Since the mass of brush 37 is less than that of brush 36, the driven structure must reach a higher speed to cause brush 37 to overcome the pressure of spring 43.

It is the relationship between the mass of each brush and the spring constant of the associated coil spring which determines the speed at which the brush will move out of contact with its associated slip rings. Thus, brush 37 may be made responsive to a higher speed than brush 36 by making brushes 36 and 37 of the same mass and making spring 43 with a larger spring constant than spring 42.

While the embodiment illustrated utilizes two brushes and three slip rings to selectively obtain any one of three predetermined speeds, it will be obvious that, by the inclusion of additional slip rings and brushes, additional predetermined speed settings are possible. Also, one slip ring and one brush may be omitted if only two speeds are desired. If desired, the core 23 may be constructed to rotate with driving structure 11, in which case an additional slip ring and brush would be provided to supply electrical energy to winding 24.

Also, while for the sake of simplicity, switch 48 has been shown as being manually operable, proper timer switches can be used which would automatically make the different brushes effective at different times in the cycle of operation of a machine.

By the present invention I provide a new and improved speed controlled electromagnetic clutch mechanism which is constructed from a minimum number of low-cost parts and is effective selectively to provide any one of a number of predetermined speeds in an economical and durable manner.

While, in accordance with the patent statutes, I have described what, at present, is considered to be the preferred embodiment of my invention, it will be obvious to those skilled in the art that various changes and modifications may be made thereto without departing from the invention and I, therefore, aim in the appended claims, to cover such changes and modifications as fall within the true spirit and scope of my invention.

What I claim as new and desire to secure by Letters Patent of the United States is:

1. An electromagnetic clutch including:
 (a) a rotary driving structure,
 (b) a rotary driven structure mounted adjacent said driving structure,
 (c) an electrical winding arranged to induce a magnetic field in said driving structure and said driven structure to operatively connect said driving structure and said driven structure,
 (d) a plurality of slip rings,
 (e) a plurality of brushes slidingly mounted on said driven structure for cooperation with said slip rings,
 (f) each of said brushes being of a different mass than any other of said brushes so that centrifugal force during rotation of said driven structure causes each of said brushes to separate from its corresponding slip rings at a different speed than any other of said brushes,
 (g) a circuit, including said slip rings, for providing electric energy to said electric winding, and
 (h) a switch in said circuit for selectively connecting any one of said brushes in said circuit for causing said driven member to be rotated at any one of a plurality of predetermined speeds.

2. An electromagnetic clutch including:
 (a) a rotary driving shaft,
 (b) a flat, driving plate mounted on said shaft for rotation therewith,
 (c) a rotary driven structure including a flat member disposed adjacent said driving plate,
 (d) a stationary member mounted adjacent said driving plate and said flat member and supporting an electrical winding for inducing a magnetic field in said driving plate and said flat member, said field bringing said driving plate and said flat member into operative engagement,
 (e) a plurality of slip rings mounted on said stationary member and a plurality of cooperating brushes slidingly mounted on said driven structure,
 (f) each of said brushes being of a different mass than any other of said brushes so that centrifugal force during rotation of said driven structure causes each of said brushes to separate from its corresponding slip rings at a different speed than any other of said brushes,
 (g) a circuit, including said slip rings, for providing electric energy to said electric winding, and (h) a switch in said circuit for selectively connecting any one of said brushes in said circuit for causing said driven member to be rotated at any one of a plurality of predetermined speeds.

3. An electromagnetic clutch including:
(a) a rotary driving shaft,
(b) a flat, driving plate mounted on said shaft for rotation therewith,
(c) a rotary driven structure including a flat member disposed adjacent said driving plate,
(d) a stationary member mounted adjacent said driving plate and said flat member and supporting an electrical winding for inducing a magnetic field in said driving plate and said flat member, said field bringing said driving plate and said flat member into operative engagement,
(e) a plurality of slip rings mounted on the outer surface of said stationary member,
(f) said driven structure including a plurality of mounting members extending adjacent to but spaced from said stationary member, each mounting member including a recess facing said stationary member,
(g) a spring loaded brush slidingly mounted in each of said recesses for engagement with predetermined ones of said slip rings,
(h) the relationship between the mass of each of said brushes and the spring constant of its associated spring being different than the relationship between the mass of any other of said brushes and the spring constant of its associated spring so that centrifugal force during rotation of said driven structure causes each of said brushes to separate from its corresponding slip rings at a different speed than any other of said brushes,
(i) a circuit, including said slip rings, for providing electric energy to said electric winding, and
(j) a switch in said circuit for selectively connecting any one of said brushes in said circuit for causing said driven member to be rotated at any one of a plurality of predetermined speeds.

4. An electromagnetic clutch including:
(a) a rotary driving shaft,
(b) a flat, driving plate of magnetic material mounted on said shaft for rotation therewith, said driving plate including an annular paramagnetic isolation piece,
(c) a rotary driven structure including a flat member of magnetic material disposed adjacent one side of said driving plate,
(d) an annular stationary member mounted adjacent the other side of said driving plate and supporting an electrical winding adjacent said isolation piece for inducing a magnetic field in said driving plate and said flat member, said field bringing said driving plate and said flat member into operative engagement,
(e) a plurality of slip rings mounted on the outer surface of said stationary member,
(f) said driven structure including a plurality of mounting members extending adjacent to but spaced from said stationary member, each mounting member including a recess facing said stationary member,
(g) a spring loaded brush slidingly mounted in each of said recesses for engagement with predetermined ones of said slip rings,
(h) the relationship between the mass of each of said brushes and the spring constant of its associated spring being different than the relationship between the mass of any other of said brushes and the spring constant of its associated spring so that centrifugal force during rotation of said driven structure causes each of said brushes to separate from its corresponding slip rings at a different speed than any other of said brushes,
(i) a circuit including said slip rings, for providing electric energy to said electric winding, and
(j) a switch in said circuit for selectively connecting any one of said brushes in said circuit for causing said driven member to be rotated at any one of a plurality of predetermined speeds.

5. An electromagnetic clutch including:
(a) a rotary driving shaft,
(b) a flat, driving plate of magnetic material mounted on said shaft for rotation therewith, said driving plate including an annular paramagnetic isolation piece,
(c) a rotary driven structure including a flat member of magnetic material disposed adjacent one side of said driving plate,
(d) an annular stationary member mounted adjacent the other side of said driving plate and supporting an electrical winding adjacent said isolation piece for inducing a magnetic field in said driving plate and said flat member, said field bringing said driving plate and said flat member into operative engagement,
(e) a plurality of slip rings mounted on the outer surface of said stationary member,
(f) said driven structure including a plurality of mounting members extending adjacent to but spaced from said stationary member, each mounting member including a recess facing said stationary member,
(g) a brush slidingly mounted in each of said recesses,
(h) a spring mounted in each of said recesses in engagement with a corresponding one of said brushes to bias each of said brushes into engagement with predetermined ones of said slip rings,
(i) each of said brushes being of a different mass than any others of said brushes and each of said springs having substantially the same spring constant as each of the other of said springs so that centrifugal force during rotation of said driven structure causes each of said brushes to separate from its corresponding slip rings at a different speed than any other of said brushes,
(j) a circuit including said slip rings, for providing electric energy to said electric winding, and
(k) a switch in said circuit for selectively connecting any one of said brushes in said circuit for causing said driven member to be rotated at any one of a plurality of predetermined speeds.

6. An electromagnetic clutch including:
(a) a rotary driving shaft,
(b) a flat, driving plate of magnetic material mounted on said shaft for rotation therewith, said driving plate including an annular paramagnetic isolation piece,
(c) a rotary driven structure including a flat member of magnetic material disposed adjacent one side of said driving plate,
(d) an annular stationary member mounted adjacent the other side of said driving plate and supporting an electrical winding adjacent said isolation piece for inducing a magnetic field in said driving plate and said flat member, said field bringing said driving plate and said flat member into operative engagement,
(e) a plurality of slip rings mounted on the outer surface of said stationary member,
(f) said driven structure including a plurality of mounting members extending adjacent to but spaced from said stationary member, each mounting member including a recess facing said stationary member,
(g) a brush slidingly mounted in each of said recesses,
(h) a spring mounted in each of said recesses in engagement with a corresponding one of said brushes to bias each of said brushes into engagement with predetermined ones of said slip rings,
(i) each of said brushes being of substantially the same mass as each of the other of said brushes and each of said springs having a different spring constant than any other of said brushes so that centrifugal force during rotation of said driven structure causes each of said brushes to separate from its corresponding slip rings at a different speed than any other of said brushes,
(j) a circuit including said slip rings, for providing electric energy to said electric winding, and
(k) a switch in said circuit for selectively connecting any one of said brushes in said circuit for causing said driven member to be rotated at any one of a plurality of predetermined speeds.

References Cited by the Examiner

UNITED STATES PATENTS

| | | | |
|---|---|---|---|
| 2,401,003 | 5/1946 | Lear | 192—84 X |
| 2,528,316 | 10/1950 | Mayo | 192—104 X |
| 3,159,257 | 12/1964 | Bochan | 192—104 X |

DAVID J. WILLIAMOWSKY, *Primary Examiner.*

B. W. WYCHE, *Assistant Examiner.*